(12) United States Patent
Himura et al.

(10) Patent No.: US 10,123,174 B2
(45) Date of Patent: Nov. 6, 2018

(54) MOBILITY DATA PROCESSING APPARATUS, MOBILITY DATA PROCESSING METHOD AND MOBILITY DATA PROCESSING SYSTEM

(71) Applicant: HITACHI, LTD., Tokyo (JP)

(72) Inventors: Yosuke Himura, Tokyo (JP); Mitsunari Kobayashi, Tokyo (JP); Yoshiko Yasuda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/893,539

(22) Filed: Feb. 9, 2018

(65) Prior Publication Data

US 2018/0279085 A1 Sep. 27, 2018

(30) Foreign Application Priority Data

Mar. 23, 2017 (JP) .................................. 2017-057232

(51) Int. Cl.
| | |
|---|---|
| *H04W 24/00* | (2009.01) |
| *H04W 4/024* | (2018.01) |
| *H04W 4/23* | (2018.01) |
| *H04W 4/029* | (2018.01) |
| *H04W 4/02* | (2018.01) |

(52) U.S. Cl.
CPC .......... *H04W 4/024* (2018.02); *H04W 4/023* (2013.01); *H04W 4/029* (2018.02); *H04W 4/23* (2018.02)

(58) Field of Classification Search
CPC ........ H04W 4/024; H04W 4/23; H04W 4/029
USPC ................ 455/456.3, 456.1, 414.1, 418, 403
See application file for complete search history.

(56) References Cited

U.S. PATENT DOCUMENTS

| | | | |
|---|---|---|---|
| 2003/0096621 A1 | 5/2003 | Jana et al. | |
| 2008/0054072 A1 | 3/2008 | Katragadda et al. | |
| 2013/0157628 A1* | 6/2013 | Kim ..................... | A01K 15/023 455/414.1 |
| 2013/0247117 A1* | 9/2013 | Yamada ................. | G08C 17/02 725/93 |
| 2014/0073362 A1 | 3/2014 | Kawata et al. | |
| 2015/0004958 A1 | 1/2015 | Wang et al. | |
| 2015/0319563 A1* | 11/2015 | Johnson ................. | H04W 4/02 455/456.3 |
| 2016/0019592 A1 | 1/2016 | Muttineni et al. | |

(Continued)

FOREIGN PATENT DOCUMENTS

JP 2013-013143 A 1/2013

OTHER PUBLICATIONS

Singaporean Office Action dated Jun. 26, 2018 for the Singaporean Patent Application No. 10201801174Y.

(Continued)

*Primary Examiner* — Nghi H Ly
(74) *Attorney, Agent, or Firm* — Volpe and Koenig, P.C.

(57) ABSTRACT

A management server is adapted to be provided with: a field data managing unit configured to store mobility data of mobility instances; a group possibility degree determining unit configured to execute a predetermined process for improving identification of mobility context, for the mobility data; and a group extracting unit configured to, based on a time distance and a spatial distance between mobility data of one mobility instance and mobility data of another mobility instance, identify mobility context of the one mobility instance after the process is performed.

15 Claims, 14 Drawing Sheets

(56) References Cited

U.S. PATENT DOCUMENTS

2016/0381509 A1  12/2016  Edge
2017/0006449 A1   1/2017  Igumnov et al.

OTHER PUBLICATIONS

Extended European Search Report dated Jul. 23, 2018 for the European Patent Application No. 18155966.7.

* cited by examiner

FIG. 2

Update target management table 123

| Instance type | Update target table | |
|---|---|---|
| Person | Mobility data management table<br>Mobility instance state management table | 211 |
| Passenger car | Mobility data management table<br>Mobility instance state management table | 212 |
| Station | Infra capacity state management table | 213 |
| Road | Infra capacity state management table | 214 |
| Eating house | Provider capacity state management table | 215 |
| : | : | |

Field data managing unit 113

Mobility instance state management table 134

| Mobility instance ID | Mobility instance type | Position | Mobility instance state | Final update time point | |
|---|---|---|---|---|---|
| Automobile 01 | Car | (x,y) | Low speed | XX:XX:XX | 411 |
| Automobile 02 | Car | (x,y) | Low speed | XX:XX:XX | 412 |
| Person 02 | Person | (x,y) | Movement | XX:XX:XX | 413 |
| Person 03 | Person | (x,y) | Movement | XX:XX:XX | 414 |
| Bicycle 02 | Bicycle | (x,y) | Movement | XX:XX:XX | 415 |
| Truck 01 | Large-sized car | (x,y) | End of driving | XX:XX:XX | 416 |
| : | : | : | : | : | |

401 402 403 404 405

Mobility group management table 135

| Mobility instance ID | Mobility instance type | Mobility group ID | Update time point | |
|---|---|---|---|---|
| Person 01 | Person | 1 | XX:XX:XX | 431 |
| Person 02 | Person | 1 | XX:XX:XX | 432 |
| Person 03 | Person | 1 | XX:XX:XX | 433 |
| Person 04 | Person | 2 | XX:XX:XX | 434 |
| Person 05 | Person | 2 | XX:XX:XX | 435 |
| : | : | : | : | |

421 422 423 424

Infra capacity state management table 136

| Infra capacity ID | Infra capacity type | Position | Capacity state | Time | |
|---|---|---|---|---|---|
| Road A | Motorway | (x,y) | Limit | XX:XX:XX | 451 |
| Road B | Motorway | (x,y) | Sufficient | XX:XX:XX | 452 |
| Station C | Accommodation body | (x,y) | Limit | XX:XX:XX | 453 |
| Elevator D | Transportation body | (x,y) | Sufficient | XX:XX:XX | 454 |
| Bus E | Transportation body | (x,y) | Sufficient | XX:XX:XX | 455 |
| Train F | Transportation body | (x,y) | Limit | XX:XX:XX | 456 |
| : | : | : | : | : | |

Group possibility degree temporary management table 153

| Mobility instance ID | Mobility instance type | Time point | Position | Group possibility degree | |
|---|---|---|---|---|---|
| Person 01 | Person | 13:00:03 | (x,y) | 0 | 511 |
| Person 02 | Person | 13:00:04 | (x,y) | 1 | 512 |
| Person 03 | Person | 13:00:04 | (x,y) | 1 | 513 |
| : | : | : | : | | |

Example of GUI

MOBILITY DATA PROCESSING APPARATUS, MOBILITY DATA PROCESSING METHOD AND MOBILITY DATA PROCESSING SYSTEM

CROSS-REFERENCE TO PRIOR APPLICATION

This application relates to and claims the benefit of priority from Japanese Patent Application No. 2017-057232 filed on Mar. 23, 2017, the entire disclosure of which is incorporated herein by reference.

BACKGROUND

The present invention relates to a mobility data processing apparatus and the like for analyzing mobility data about a mobility instance (a mobile body).

Recently, the term IoT (Internet of Things) has been attracting attention. IoT is variously interpreted. In the present specification, it is assumed that IoT means to, by sensing and collecting data about activity statuses of various objects and things in the real world, and analyzing and utilizing the data, create new value.

As a use case of such IoT, guidance for reducing congestion can be given. Specifically, if congestion of persons (pedestrians) at a facility such as a station or congestion such as a traffic jam on a road occurs, the congestion is reduced by appropriately guiding mobile bodies (referred to as mobility instances) such as persons and cars to a vacant facility or road. For this purpose, by sensing, collecting and analyzing the congestion status of the congested area and the availability status of a guidance destination, and, sometimes, by analyzing profile information such as the tastes of the individual person together, an appropriate guidance destination is identified, and guidance is performed by sending a notification to terminal such as smartphone and mobile phone owned by the person or terminal such as on-board device of the car so that congestion is reduced.

As for measurement of the congestion status, there may be a case where the congestion status is directly measured with a camera or the like, or there may be a case where pieces of position data (referred to as mobility data) acquired by the mobile terminals of the individual persons or GPS's which are the on-board devices of the cars are aggregately totalized to make a judgment. As for the notification to perform the guidance, it is also conceivable to, in addition to provision of information, give an incentive, for example, by distributing a coupon for a movement destination facility in some cases so that motivation for the guidance is improved.

As another use case of IoT, digital signage for improving supply-demand efficiency is given. Specifically, an advertisement is presented to person at an appropriate place and an appropriate timing. The person may be pedestrian or that in a facility. Driver and passenger of passenger car or passenger of other transportation means is also conceivable. The delivery destination may be personal mobile terminal or may be a display in a facility. In order to realize this use case, by performing analysis based on position information (which can be measured, for example, by GPS's of mobile terminals), profile information and the like about the persons, and, sometimes, by analyzing the surrounding situation (for example, the stock status of particular sales products in a retail store or the seat availability status of an eating house) and the like also, delivery content is decided. Then, the advertisement is delivered, in consideration of positional matching with proper neighboring displays also in the case of display delivery.

In the various use cases described above, it is thought that the effect can be improved by targeting not each individual person but each group. This is because a person acts not only as an individual but also in groups based on social relationships such as a family relationship, a workplace relationship and a friend relationship, and, furthermore, acts in groups based on differently configured social relationships according to times, places and scenes.

For example, in a use case where resolution of congestion is realized when persons are moving as a group based on a social relationship, if guidance is performed for each individual person, there is a possibility that the capacity of a guidance destination is not enough to accommodate the group or that the guidance destination does not meet the tastes of the group. Therefore, by performing guidance in consideration of a situation of the group, improvement of the effect of congestion resolution is expected. Further, in a use case of digital signage, advertisement delivery corresponding to characteristics of group becomes possible, and improvement of cost-effectiveness is expected.

For example, Japanese Patent Laid-Open No. 2013-13143 discloses a technique of grouping mobile phone terminals based on information such as space, time and speed about the individual mobile phone terminals.

SUMMARY

For example, the technique of Japanese Patent Laid-Open No. 2013-13143 can identify a statistical population group by region but cannot identify a group based on a social relationship. For example, groups based on different social relationships move by the same public transportation means, it is not possible to distinguish the groups as separate groups by position, time and speed information.

In general, since mobile terminals used to measure mobility data about persons are carried by the individual persons, it is difficult to successively identify a group based on a social relationship the configuration of which dynamically changes, from the mobility data measured by the individual mobile terminals.

Thus, it is difficult to identify context about movement of a mobility instance, such as whether the mobility instance moves belonging to a group based on the same social relationship as another mobility instance or moves belonging to a different group.

The present invention has been made in view of the above situation, and an object is to provide a technique capable of appropriately identifying mobility context which is information indicating, for a mobility instance, a characteristic of a movement relationship with another mobility instance.

In order to achieve the above object, a mobility data processing apparatus according to one aspect is a mobility data processing apparatus identifying, for one or more movable mobility instances existing in real space, mobility context which is information indicating a characteristic of a movement relationship with another mobility instance, the apparatus including: a mobility data managing unit configured to store pieces of mobility data including space information and time information about the plurality of mobility instances; a process executing unit configured to execute a predetermined process for improving identification of the mobility context, for the pieces of mobility data; and a mobility context identifying unit configured to, based on a time distance and a spatial distance between a piece of mobility data of one mobility instance and a piece of mobility data of another mobility instance, identify mobility context of the one mobility instance after the process by the process executing unit.

According to the present invention, it is possible to appropriately identify mobility context which is information indicating, for a mobility instance, a characteristic of a movement relationship with another mobility instance.

BRIEF DESCRIPTION OF THE DRAWINGS

FIG. 2 is a diagram showing a configuration example of an update target management table according to the embodiment;

FIG. 4 is a diagram showing configuration examples of the remaining tables managed by the field data managing unit according to the embodiment;

FIG. 5 is a diagram showing a configuration example of a group possibility degree temporary management table according to the embodiment;

DETAILED DESCRIPTION OF THE EMBODIMENT

Figure 1:
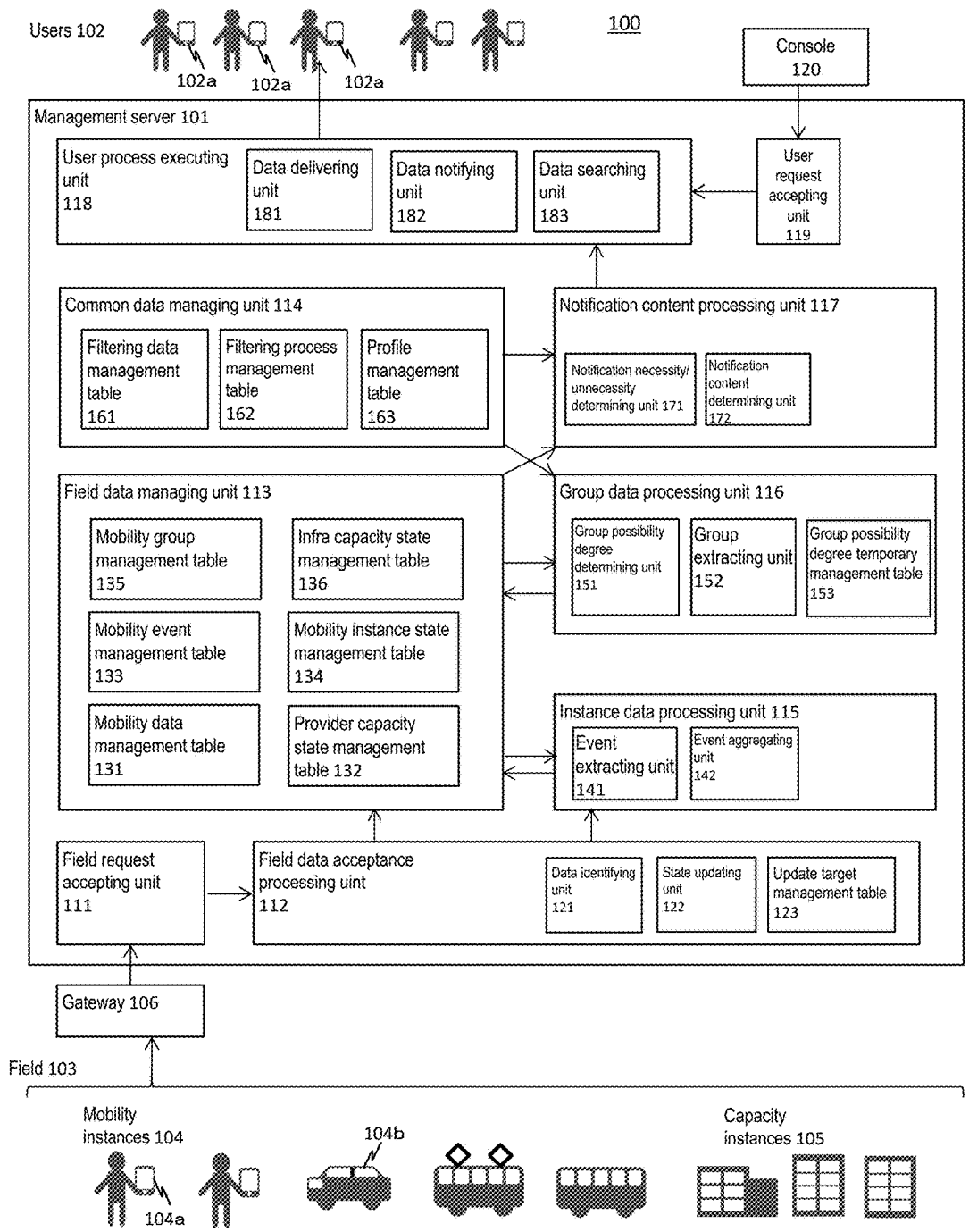
FIG. 1 is an entire configuration diagram of a mobility data processing system according to an embodiment.

An embodiment will be described with reference to drawings. The embodiment described below does not limit the invention according to the claims. Further, all of various components and combinations thereof described in the embodiment are not necessarily essential for solution means of the invention.

In the description below, a mobility instance is a general term for things (mobile bodies) moving on a field (real space). The mobile instance includes a person, a car such as a passenger car, a bus and a truck (and its driver and a passenger) and a public transportation body such as a bus and a railway car.

Further, a mobility group is a term referring to a group which is constituted by one or more mobility instances, and the one or more mobility instances of which have a strong social relationship and are thought to move as one at the time of movement.

Further, mobility data includes position information about a mobility instance and time point information about time point when the position information was measured. Further, the mobility data may include information such as speed information and movement state in addition to the position information and the time point information. The mobility data may be measured by a terminal carried by (or mounted on) a mobility instance or may be measured by a system monitoring movement of mobility instances (for example, a railway operation monitoring system) or the like.

Further, a capacity instance is a general term for things (accommodation bodies) for accommodating mobility instances on a field. The capacity instance includes, for example, a public infrastructure such as a road and a station facility, and a commercial facility such as an eating house. Further, the capacity instance is not necessarily independent from a mobility instance. For example, a transportation body like a bus is both of a capacity instance and a mobility instance. Capacity instances may be distinguished, for example, by referring to a thing which socially influences much at the time of congestion, like a public infrastructure as an infra capacity instance and referring to a thing which brings about improvement of profit by performing accommodation, like an eating house as a provider capacity instance. Here, the infra capacity instance is a capacity instance from which mobility instances are to be guided to another place at the time of congestion, and the provider capacity is a capacity instance to be a guidance destination for the mobility instances at the time of congestion of the infra capacity instance.

Further, mobility context of a mobility instance is information indicating a characteristic of a movement relationship of the mobility instance with another mobility instance. As the mobility context, for example, information showing that there is a strong possibility that a mobility instance is moving with another mobility instance as being in the same group, information showing that there is a strong possibility that the mobility instance is not moving as being in the same group, and the like are included.

Further, though time point information is shown, for example, in a simplified form of "time: minute: second" in the present specification and drawings, for example, a form in which information such as year, month and day is also included is also possible. Further, time point information may be in a form in accordance with formats such as an ISO standard form and a UNIX® time stamp.

Further, though position information is in a (x, y) coordinate form in the present specification and drawings for example, the position information may be in a form of latitude and longitude. Further, a form in which height (altitude) information is included is also possible. Further, the position information may be information by an address expression, and an address expression and a coordinate expression may be mixed. In the case of causing a coordinate expression and an address expression to be mixed, the expressions can be mutually converted using a well-known technique such as geocoding and used.

FIG. 1 is an entire configuration diagram of a mobility data processing system according to the embodiment.

A mobility data processing system 100 includes a management server 101 as an example of a mobility data processing apparatus, terminals 102a of users 102, and a gateway 106. The management server 101 receives mobility data about mobility instances 104 and data about capacity instances 105 existing in a field (real space) 103 via a communication network not shown (for example, the Internet, a mobile communication network or the like) and the gateway 106 and executes various processes. The gateway 106 performs format conversion or load balancing of various data transmitted via the communication network. The terminal 102*a* of the user 102 communicates with the management server 101 via the communication network and display various information.

In the field 103, the mobility instances 104 and the capacity instances 105 exist. For example, if a mobility instance 104 is a person, mobility data about the mobility instance 104 is transmitted from a terminal 104*a* owned by the person to the management server 101; if the mobility instance 104 is a car, the mobility data is transmitted from a terminal (an on-board device) 104*b* mounted on the car to the management server 101; and, if the mobility instance 104 is a instance like a train of which movement is monitored by a monitoring system, the mobility data is transmitted from the monitoring system to the management server 101. The person who is the mobility instance 104 and the terminal 104*a* owned by the person may correspond to a user 102 and a user terminal 102*a*.

The management server 101 includes a field request accepting unit 111, a field data acceptance processing unit 112, a field data managing unit 113, a common data managing unit 114, an instance data processing unit 115, a group data processing unit 116, a notification content processing unit 117, a user process executing unit 118 and a user request accepting unit 119. The management server 101 is coupled to a console 120 operated by an administrator who manages the management server 101.

The field request accepting unit 111 executes a process for accepting a request generated from the field 103 side. Requests generated from the field 103 (specifically, various terminals and the like in the field 103) includes reception of data from the field 103.

The field data acceptance processing unit 112 processes data received by the field request accepting unit 111. The field data acceptance processing unit 112 includes a data identifying unit 121, a state updating unit 122 and an update target management table 123. Each component of the field data acceptance processing unit 112 will be described later with reference to FIGS. 2 and 8.

The field data managing unit 113 is an example of a mobility data managing unit and manages data generated from the field 103. The field data managing unit 113 includes a mobility data management table 131, a provider capacity state management table 132, a mobility event management table 133, a mobility instance state management table 134, a mobility group management table 135 and an infra capacity state management table 136. Each component of the field data managing unit 113 will be described later with reference to FIGS. 3 and 4.

The common data managing unit 114 manages reference data to be used for a process for weighting mobility data and the like. The common data managing unit 114 includes a filtering data management table 161, a filtering process management table 162 and a profile management table 163. Each component of the common data managing unit 114 will be described later with reference to FIG. 6.

The instance data processing unit 115 processes data for each mobility instance. The instance data processing unit 115 includes an event extracting unit 141 as an example of an extraction unit and an event aggregating unit 142 as an example of an aggregation unit. Each component of the instance data processing unit 115 will be described later with reference to FIG. 9.

The group data processing unit 116 is an example of a process executing unit and performs a process for identifying a group of mobility instances. The group data processing unit 116 includes a group possibility degree determining unit 151, a group extracting unit 152 as an example of a mobility context identifying unit and a group identifying unit, and a group possibility degree temporary management table 153. Each component of the group data processing unit 116 will be described later with reference to FIGS. 5 and 10.

The notification content processing unit 117 performs a process for determining necessity/unnecessity of a notification process and notification content. The notification content processing unit 117 includes a notification necessity/unnecessity determining unit 171 as an example of an excess detecting unit, and a notification content determining unit 172. Each component of the notification content processing unit 117 will be described later with reference to FIG. 12.

The user process executing unit 118 performs delivery and notification of data to the users 102 (strictly, the user terminals 102*a*) and performs processes such as performing data search based on search requests from the users 102 (strictly, the user terminals 102*a*). The user process executing unit 118 includes a data delivering unit 181, a data notifying unit 182 and a data searching unit 183.

When activated by the user request accepting unit 119, the data searching unit 183 searches for various information based on a search request from a user terminal 102*a*. For example, if accepting a search request for searching for the capacity state of a provider capacity instance, the data searching unit 183 performs a search process for the provider capacity state management table 132 based on a space range (ranges of X and Y) and a time range (from the present to a certain time point in the past) targeted by search of the search request, type information and the like. Further, if accepting a search request for searching for congestion information about various infra capacities, such as a traffic jam and facility congestion, the data searching unit 183 performs a search process using the infra capacity state management table 136. Further, if accepting a search request for searching for a position of a particular type of mobility instance such as a position of a bus or a train, the data searching unit 183 performs a search process using the mobility instance state management table 134. Further, if accepting a search request for searching for a movement record (trajectory data) in the past, the data searching unit 183 performs a search process using the mobility data management table 131. Further, if accepting a search request for searching for an event record in the past, the data searching unit 183 performs a search process using the mobility event management table 133. As for such a search, an access control process for preventing privacy data from being searched is necessary. For example, a list permitting search only about particular instance IDs (a white list) may be prepared so that search is performed according to the list.

The data delivering unit 181 transmits various pieces of information to the user terminal 102*a*. For example, the data delivering unit 181 transmits notification content decided by the notification content determining unit 172 to terminals 102*a* of mobility instances (users) belonging to the same mobility group. Further, the data delivering unit 181 transmits a result of a search process by the data searching unit 183 to the terminal 102*a* of a search request source user.

The user request accepting unit 119 performs a process for calling various processes of the user process executing unit 118 based on a process request from a user 102 (a terminal 102a). For example, if receiving a search request from a terminal 102a, the user request accepting unit 119 activates the data searching unit 183.

The console 120 is an interface for the administrator of the management server 101 to make various configurations for the management server 101 and the like.

Figure 14:
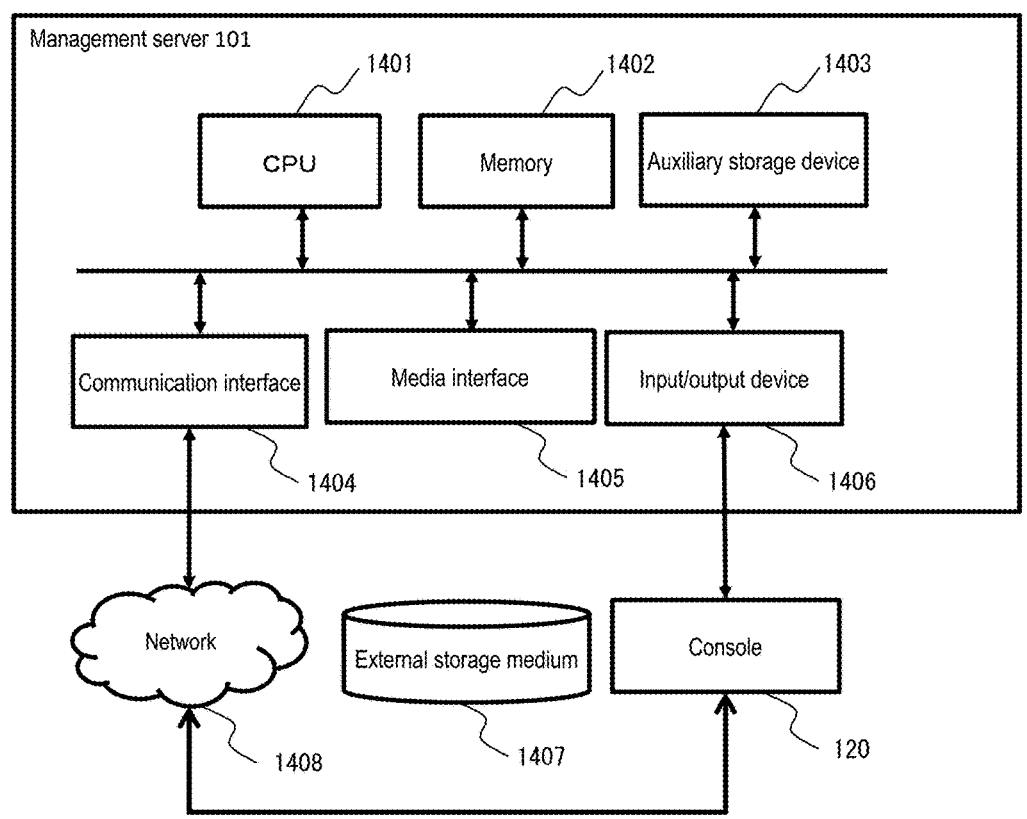
FIG. 14 is a hardware configuration diagram of a management server 101 according to the embodiment.

FIG. 14 is a hardware configuration diagram of the management server 101 according to the embodiment.

The management server 101 is, for example, a general computer and includes a CPU (Central Processing Unit) 1401, a memory 1402, an auxiliary storage device 1403, a communication interface 1404, a media interface 1405 and an input/output device 1406.

The communication interface 1404 is an interface for communicating with other apparatuses (terminals 102a, 104a, 104b and the like) via a network 1408. The CPU 1401 executes a program stored in the memory 1402 or the auxiliary storage device 1403 and executes various processes using data stored in the memory 1402 or the auxiliary storage device 1403. The memory 1402 is, for example, a RAM (Random Access Memory) and stores the program executed by the CPU 1401, data and the like. The auxiliary storage device 1403 is, for example, a hard disk, a flash memory, a RAM or the like and stores the program executed by the CPU 1401 and data used by the CPU 1401.

An external storage medium 1407 is attachable to and detachable from the media interface 1405, and the media interface 1405 mediates input/output of data to/from the external storage medium 1407. The console 120 operated by the administrator of the management server 101 is coupled to the input/output device 1406, and the input/output device 1406 performs input/output of information to/from the console 120.

As shown in FIG. 1, each functional unit implemented in the management server 101 is configured by the CPU 1401 executing the program stored in the auxiliary storage device 1403 or the memory 1402. Further, information managed by each functional unit (for example, various tables) is stored in the memory 1402 or the auxiliary storage device 1403.

The program executed by the CPU 1401 may be acquired from another apparatus via the communication interface 1404 as necessary or may be acquired by reading the program from an available medium via the media interface 1405. The medium is, for example, a communication medium (that is, a wired, wireless or optical network, or a carrier or a digital signal propagated through the network) or the external storage medium 1407 attachable to and detachable from the media interface 1405.

Next, a configuration of the update target management table 123 of the field data acceptance processing unit 112 will be described.

FIG. 2 is a diagram showing a configuration example of an update target management table according to the embodiment.

The update target management table 123 is a table specifying a table to be updated when the management server 101 receives data from the field 103. The update target management table 123 stores, for each instance type, an entry having fields of an instance type 201 and an update target table 202. In the instance type 201, an instance type is stored. In the update target table 202, the name of a table to be updated when data of an instance type stored in the instance type 201 of the entry is received is stored.

For example, according to the top entry in FIG. 2, it is seen that, if the instance type is "person", the mobility data management table 131 and the mobility instance state management table 134 are to be updated.

Next, configurations of tables managed by the field data managing unit 113 will be described.

Figure 3:
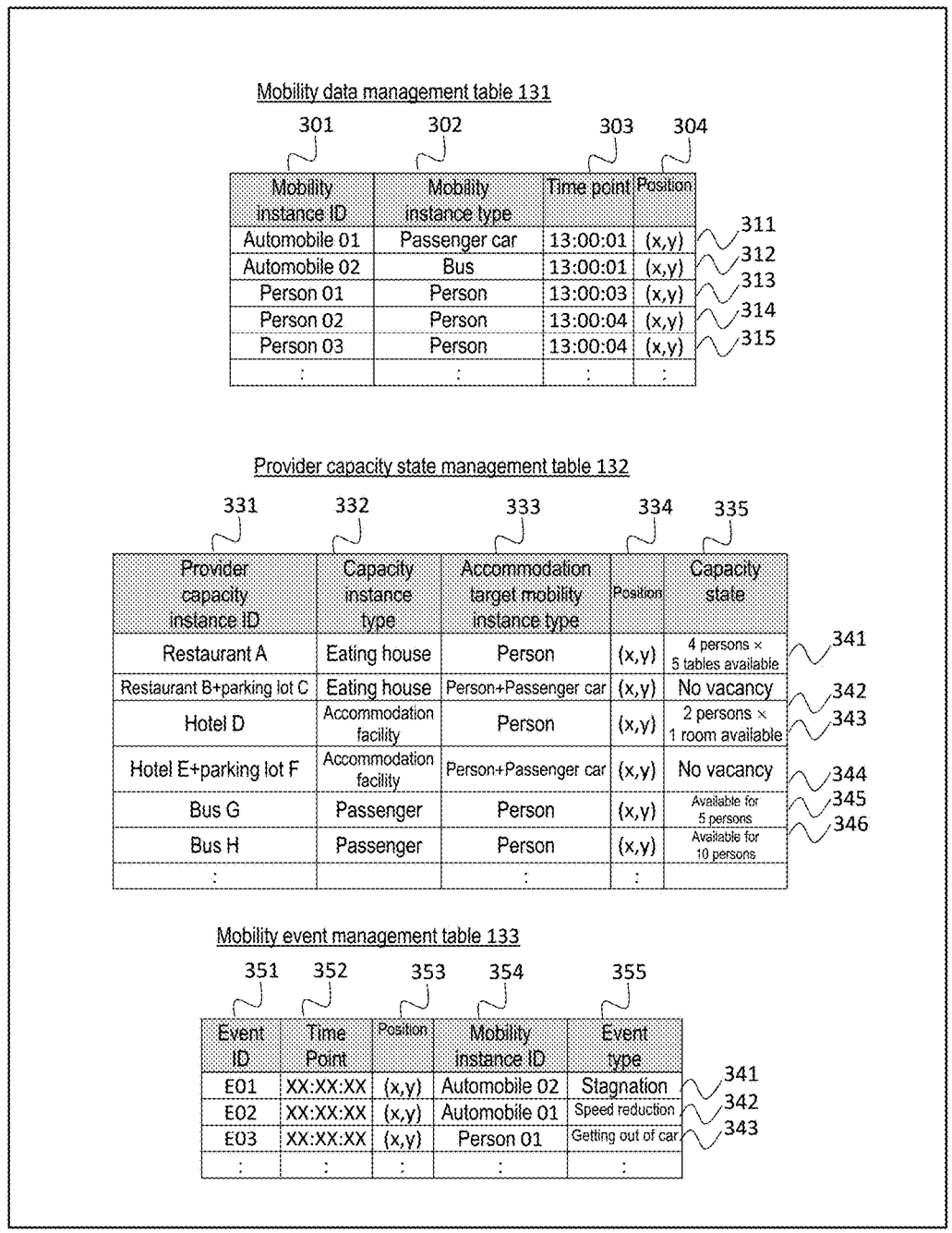
FIG. 3 is a diagram showing configuration examples of a part of tables managed by a field data managing unit according to the embodiment.

FIG. 3 is a diagram showing configuration examples of a part of tables managed by a field data managing unit according to the embodiment, and FIG. 4 is a diagram showing configuration examples of the remaining tables managed by the field data managing unit according to the embodiment.

As shown in FIGS. 3 and 4, the field data managing unit 113 manages the mobility data management table 131, the provider capacity state management table 132, the mobility event management table 133, the mobility instance state management table 134, the mobility group management table 135 and the infra capacity state management table 136. A capacity instance managing unit is configured with the provider capacity state management table 132 and the infra capacity state management table 136.

The mobility data management table 131 manages mobility data transmitted from the mobility instances 104 (or the terminal 104a and the like related to the mobility instances 104). The mobility data management table 131 stores mobility data of the mobility instances 104 from the past to the present and can be said to manage a movement history (a movement trajectory) about each mobility instance 104.

The mobility data management table 131 stores, for each piece of transmitted mobility data, an entry including fields of a mobility instance ID 301, a mobility instance type 302, a time point 303 and a position 304. In the mobility instance ID 301, an identifier for uniquely identifying a mobility instance 104 on the field 103 is stored. In the mobility instance type 302, a category name indicating a mobility instance type such as "person" and "car" is stored. In the time point 303, time point at which the mobility data was generated is stored. In the position 304, position information (for example, a measurement value by a GPS or the like) indicating a geographical position at which the mobility instance 104 existed when the mobility data was generated is stored.

The provider capacity state management table 132 is a table which manages the present and past states of provider capacity instances among the capacity instances 105. The provider capacity state management table 132 stores, for each provider capacity instance, an entry having fields of a provider capacity instance ID 331, a capacity instance type 332, an accommodation target mobility instance type 333, a position 334 and a capacity state 335.

In the provider capacity instance ID 331, an identifier for uniquely identifying the provider capacity instance on the field 103 is stored. In the capacity instance type 332, a category name indicating a capacity instance type such as "eating house" and "accommodation facility" is stored. In the accommodation target mobility instance type 333, a category name indicating a mobility instance type which the capacity instance corresponding to the entry can be accommodated is stored. In the position 334, position information about the capacity instance is stored. In the capacity state 335, vacant state information about the capacity instance is stored.

The mobility event management table 133 manages events which occur in relation to the mobility instances 104. Here, as the events, for example, speed reduction of a car, a person getting out of the car and the like are given. Such an event can be used to estimate the congestion status of an infra capacity instance such as a road. This is because, while a traffic volume can be measured, for example, by counting the number of mobility instances on a road, a traffic jam status is not necessarily reflected, but, on the other hand, it can be thought that an event such as speed reduction reflects a traffic jam status.

The mobility event management table 133 stores, for each occurred event, an entry including fields of an event ID 351, a time point 352, a position 353, a mobility instance ID 354 and an event type 355. In the event ID 351, an identifier for uniquely identifying the event is stored. In the time point 352, time point at which the event of the entry occurred is stored. In the position 353, information about a position at which the event of the entry occurred is stored. In the mobility instance ID 354, an ID of a mobility instance to which the event of the entry is related is stored. In the event type 355, a category name indicating the type of the event of the entry is stored. A field for storing related parameters (such as car speed) of the event may be provided for this entry.

The mobility instance state management table 134 manages the present and past states of the mobility instances 104. The mobility instance state management table 134 stores, for each mobility instance 104, an entry including fields of a mobility instance ID 401, a mobility instance type 402, a position 403, a mobility instance state 404 and a final update time 405.

In the mobility instance ID 401, an identifier for uniquely identifying the mobility instance 104 on the field 103 is stored. In the mobility instance type 402, a category name indicating the type of the mobility instance 104 is stored. In the position 403, position information about the mobility instance 104 is stored. In the mobility instance state 404, a category name indicating the state of the mobility instance 104 is stored. In the final update time 405, final update time point at which the state of the mobility instance 104 of the entry was updated is stored. Each entry may be further provided with a field for storing more detailed information (for example, speed) about a category name in the mobility instance state 404.

The mobility group management table 135 manages pieces of information about group (mobility group) for movement of the mobility instance 104. The mobility group management table 135 stores, for each mobility instance 104, an entry including fields of a mobility instance ID 421, a mobility instance type 422, a mobility group ID 423 and an update time 424. In the mobility instance ID 421, an identifier for uniquely identifying the mobility instance 104 is stored. In the mobility instance type 422, a category name indicating the type of the mobility instance 104 is stored. In the mobility group ID 423, an identifier for uniquely identifying a group to which the mobility instance 104 belongs is stored. In the update time 424, time point at which group information was identified is stored.

The infra capacity state management table 136 manages the present and past capacity states of infra capacities. The infra capacity state management table 136 stores, for each infra capacity instance, an entry including fields of an infra capacity ID 441, an infra capacity type 442, a position 443, a capacity state 444 and a time point 445. In the infra capacity ID 441, an identifier for uniquely identifying the infra capacity instance is stored. In the infra capacity type 442, a category name indicating the type of the infra capacity instance is stored. In the position 443, position information about the infra capacity instance is stored. In the capacity state 444, the state of the infra capacity instance, for example, a congestion degree is stored. In the time 445, time point at which infra capacity state information was updated is stored. Since there are some infra capacity instances that cannot be expressed by coordinates of one point such as a road, a field for performing management with an expression such as a row of dots and an area may be added.

In the present embodiment, by making an abstract table configuration absorbing differences among types, like the various tables of the field data managing unit 113, instead of creating a table for each type of mobility instances and capacity instances, it is possible to compatible with various types of instances.

Next, a configuration of the group possibility degree temporary management table 153 of the group data processing unit 116 will be described.

FIG. 5 is a diagram showing a configuration example of a group possibility degree temporary management table according to the embodiment.

The group possibility degree temporary management table 153 is a table which manages weight information for mobility data as the degree of group possibility, which is to be used for determining a group of mobility instances 104. The group possibility degree temporary management table 153 stores an entry including fields of a mobility instance ID 501, a mobility instance type 502, a time point 503, a position 504 and a group possibility degree 505. In the mobility instance ID 501, an identifier for uniquely identifying the mobility instance 104 is stored. In the mobility instance type 502, a category name indicating the type of the mobility instance 104 is stored. In the time point 503, time point at which the mobility data was acquired is stored. In the position 504, information about a position at which the mobility data was generated is stored. In the group possibility degree 505, weight information at the time of identifying a group for the mobility data is stored. In the present embodiment, the weight is a value in a range between 0 and 1 including 0 and 1, and shows that, as the value is closer to 1, the degree of easiness at the time of identifying a group is higher.

Next, configurations of tables managed by the common data managing unit 114 will be described.

Figure 6:
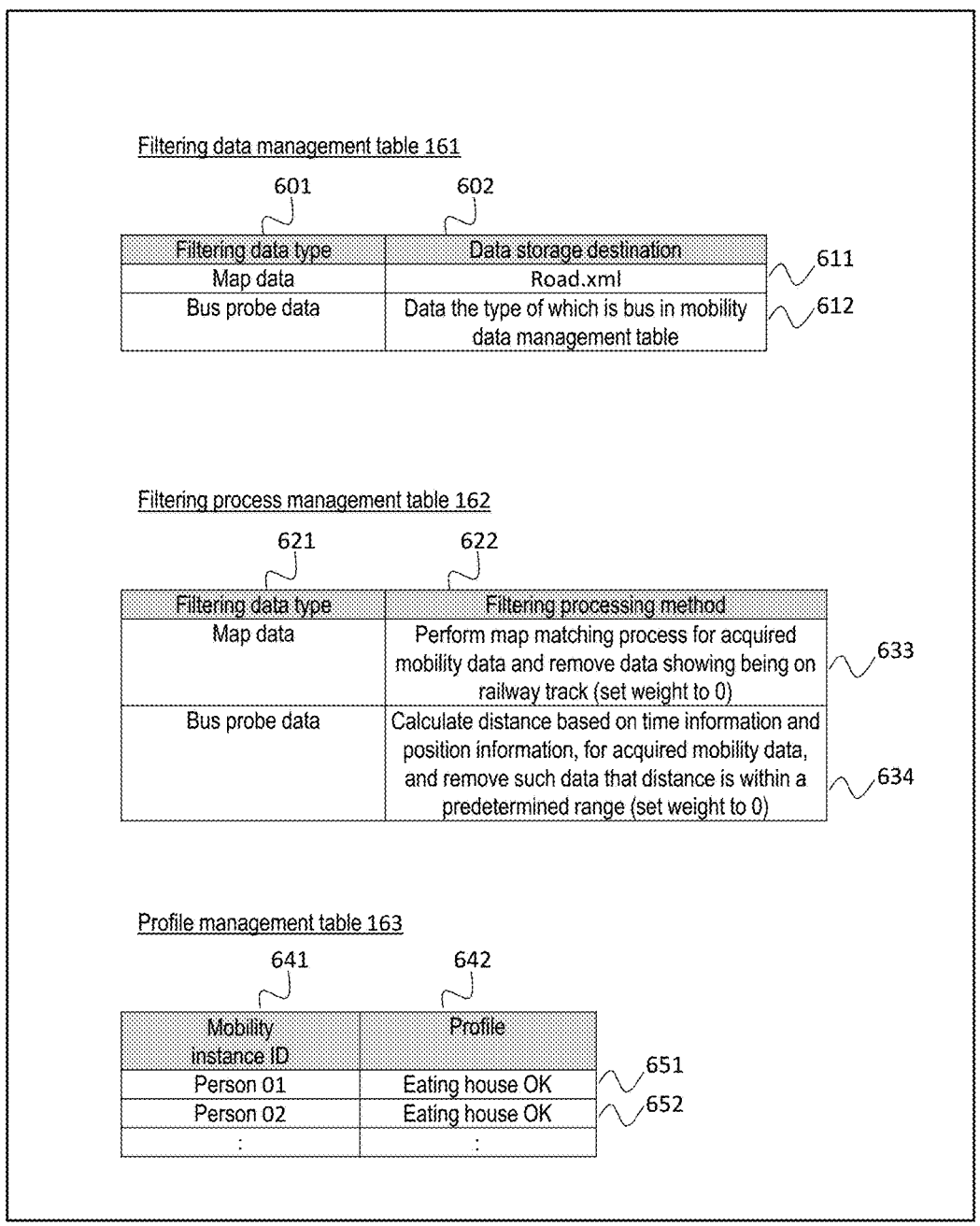
FIG. 6 is a diagram showing configuration examples of tables managed by a common data management unit according to the embodiment.

FIG. 6 is a diagram showing configuration examples of tables managed by a common data management unit according to the embodiment.

As described before, the common data managing unit 114 includes the filtering data management table 161, the filtering process management table 162 and the profile management table 163.

The filtering data management table 161 is a table which manages reference data for performing a mobility data weighting process. The filtering data management table 161 stores, for each piece of data used for filtering, an entry including fields of a filtering data type 601 and a data storage destination 602. In the filtering data type 601, a category name indicating the type of reference data to be used to weight mobility data is stored. In the data storage destination 602, a storage destination or acquisition method for the filtering data of the entry is stored. In the example of FIG. 6, an entry 611 shows that, as the filtering data, map data (expressed by a graph structure or the like) is stored as a file Road.xml in the XML (eXtensible Markup Language) format, and an entry 612 shows that bus probe data (mobility data of a bus) can be acquired from the mobility data management table 131.

The filtering process management table 162 is a table which manages process content of the weighting process. The filtering process management table 162 stores, for each piece of data used for filtering, an entry including fields of a filtering data type 621 and a filtering processing method 622. In the filtering data type 621, a category name indicating the type of reference data to be used to weight mobility data is stored. In the filtering processing method 622, a method for a process for giving weight to the mobility data using the reference data of the filtering data is stored. In the example of FIG. 6, an entry 633 shows that a process for map matching with map data is performed for mobility data so that such mobility data that is determined to show being on a railway track is removed (in the present embodiment, weight to be given to the mobility data is set to 0); and an entry 634 shows that a spatiotemporal distance (a distance based on time information and space information) from bus probe data is calculated for mobility data so that such mobility data that the distance is within a predetermined range is removed (in the present embodiment, weight is set to 0). Though the weight to be given to mobility data is set to 0 in the example of FIG. 6, the weight to be given may be a value within a range between 0 and 1 including 0 and 1.

Here, the weight to be given to mobility data will be described. This weight is weight regarding easiness of identification of mobility context (for example, information distinguishing whether or not a mobility instance belongs to the same group (a mobility group) with regard to movement) for mobility data. In the present embodiment, the weight regarding easiness of identification is increased if identification of the mobility context is easy, and the weight is decreased if identification is difficult. For example, as data from which it is difficult whether or not a mobility instance belongs to the same group with regard to movement, mobility data measured at a highly public place where a plurality of different groups are easily mixed, such as inside a railway car, a bus and a station facility, is given. On the other hand, as data from which it is easy to distinguish whether or not a mobility instance belongs to the same group with regard to movement, mobility data measured at a place where different groups are easily independent from one another, for example, mobility data on a general road where the groups are walking or moving in cars is given.

The profile management table 163 manages supplementary information for deciding appropriate guidance destinations for the mobility instance 104, for example, profile information about the tastes of the mobility instance 104. The profile management table 163 stores, for each mobility instance 104, an entry including fields of a mobility instance ID 641 and a profile 642. In the mobility instance ID 641, an identifier for uniquely identifying the mobility instance 104 is stored. In the profile 624, profile information such as the tastes of the mobility instance 104 is stored. As the profile information, for example, the type of a capacity instance which allows being notified as a guidance destination is given.

Next, a process operation of the mobility data use system 100 will be described.

Figure 7:
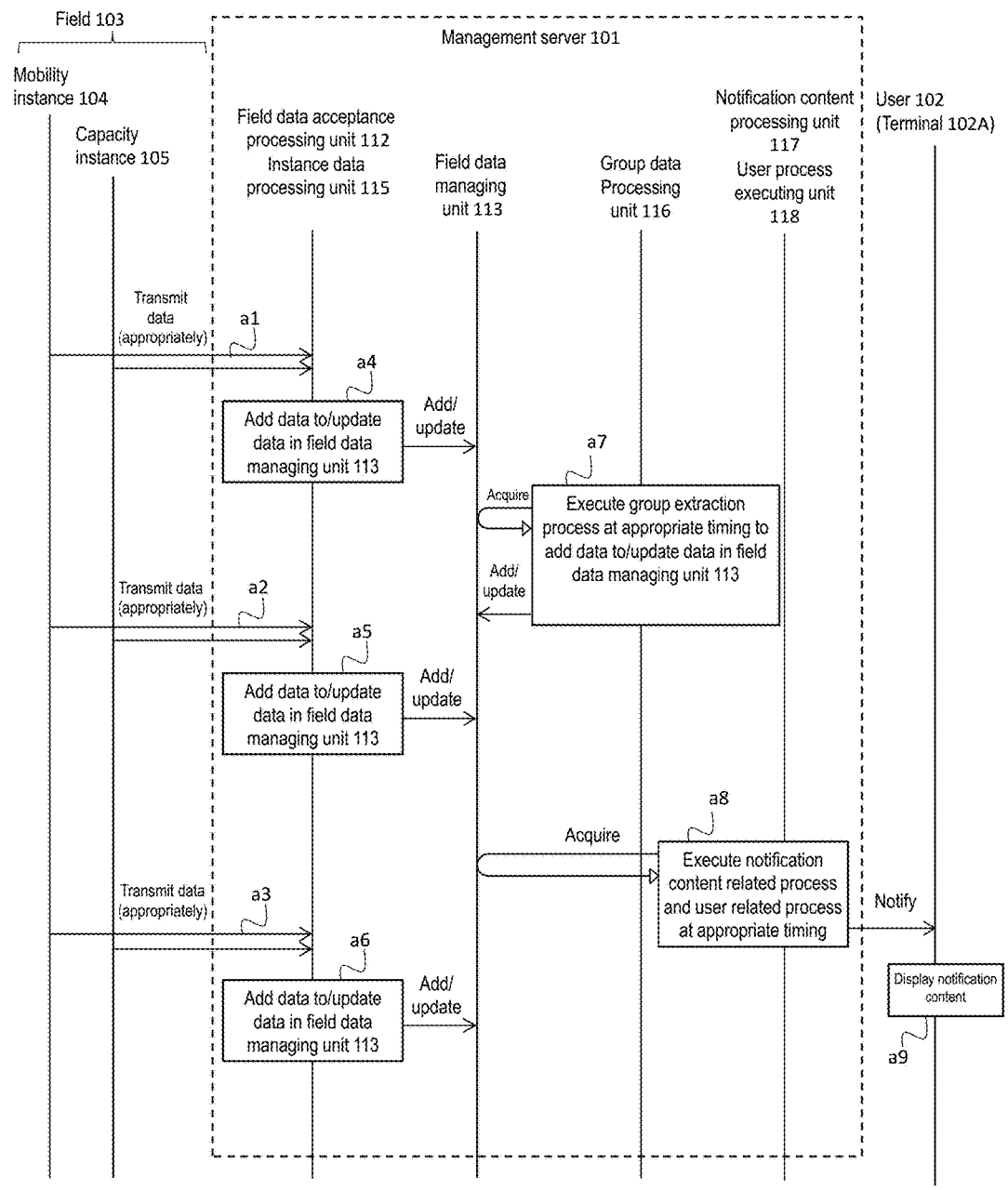
FIG. 7 is a sequence chart showing an operation example of a mobility data use system according to the embodiment.

FIG. 7 is a sequence chart showing an operation example of a mobility data use system according to the embodiment.

The mobility instance 104 (or the terminal 104a or the like carried by the mobility instance 104) transmits mobility data to the management server 101 at appropriate timings (steps a1 to a3). Further, the capacity instance 105 (or terminal provided for the capacity instance 105) transmits capacity state data about the capacity instance 105 to the management server 101 at appropriate timings (steps a1 to a3). The mobility instance 104 and the capacity instance 105 transmit the data via a communication network or the gateway 106 though it is not shown.

In the management server 101, the field data acceptance processing unit 112 and the instance data processing unit 115 perform processes for the received data (steps a4 to a6). Specifically, the field data acceptance processing unit 112 and the instance data processing unit 115 add data to or update data in the field data managing unit 113 according to the classification of the received data. Further, the field data acceptance processing unit 112 and the instance data processing unit 115 also perform processes such as for event extraction and aggregation of infra capacity states as necessary. The processes may be executed at appropriate timings. The processes may be executed with a timing of receiving the data as a trigger, or may be periodically executed by buffering the received data.

The group data processing unit 116 of the management server 101 performs a process for identifying groups of the mobility instances 104 from data (mobility data about the mobility instances 104) accumulated in the field data managing unit 113, and adds a result of the process to the field data managing unit 113 or updates the data in the field data managing unit 113 with the result (step a7). This process can be performed at an appropriate timing and is not necessarily required to be synchronized with receiving of data.

Further, the notification content processing unit 117 and the user process executing unit 118 of the management server 101 decide whether or not to make a notification to the terminal 102a of the user 102 and notification content based on group information and various pieces of capacity state information accumulated in the field data managing unit 113, and perform a process for notification to the terminal 102a of the user 102 as necessary (step a8). This process can be performed at an appropriate timing and is not necessarily required to be synchronized with receiving of data or a timing of updating content of the data in the field data managing unit 113.

The user terminal 102a of the user 102 displays the notification content received from the user process executing unit 118 on screen (step a9).

Next, a process operation of the field data acceptance processing unit 112 of the management server 101 will be described.

Figure 8:
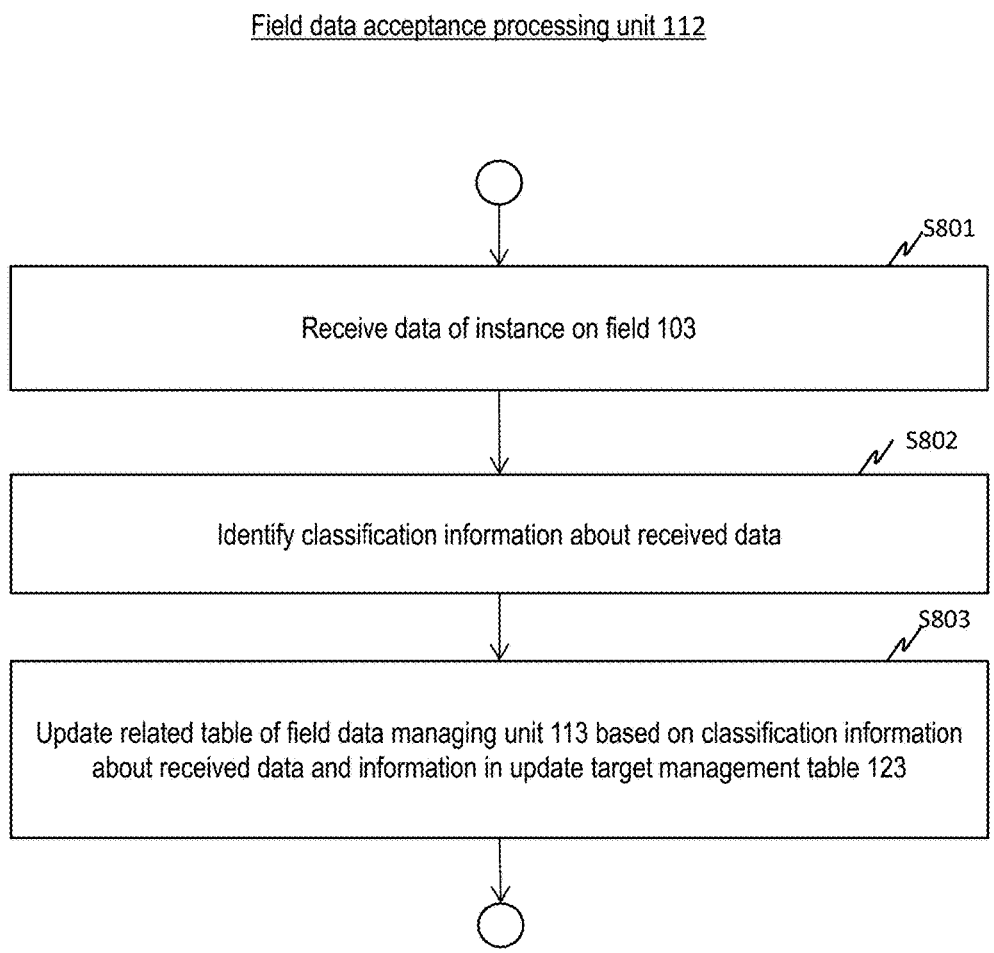
FIG. 8 is a flowchart showing an example of a process by a field data acceptance processing unit according to the embodiment.

FIG. 8 is a flowchart showing an example of a process by a field data acceptance processing unit according to the embodiment.

The field data acceptance processing unit 112 receives data from an instance (a mobility instance 104 or a capacity instance 105) on the field 103 and updates an appropriate table in the field data managing unit 113 (S801 to S803).

Specifically, the field data acceptance processing unit 112 receives data from an instance (a mobility instance or a capacity instance) on the field 103 (S801). Data received from a mobility instance 104 includes a position, time point, a mobility instance type and the like (and speed and the like as necessary) according to the table configuration of the mobility data management table 131. Data received from a capacity instance 105 includes a position, time point, a capacity state and the like according to the table configurations of the provider capacity state management table 132 and the infra capacity state management table 136.

Next, the data identifying unit 121 identifies classification information (a mobility instance type or a capacity instance type) about the received data (S802).

Next, the state updating unit 122 updates a related table in the field data managing unit 113 based on the classification information about the received data and information in the update target management table 123 (S803). For example, if the type of the received data is mobility instance related ("person", "car" or the like), the state updating unit 122 adds the data to the mobility data management table 131. On the other hand, if the type of the received data is capacity instance related, the state updating unit 122 updates the provider capacity state management table 132.

If it is possible to directly measure capacity information about an infra capacity instance 105 and acquire the data, the state updating unit 122 directly updates capacity information of the infra capacity state management table 136. In this case, the instance data processing unit 115 is required not to perform an event aggregation process to be described later for this infra capacity instance 105.

Further, if speed information or the like is directly included in the data received from a mobility instance 104, the state updating unit 122 may directly update data of the mobility instance state management table 134. In this case, the instance data processing unit 115 is required not to perform processes such as event extraction to be described later for this mobility instance 104.

Next, a process operation of the instance data processing unit 115 of the management server 101 will be described.

Figure 9:
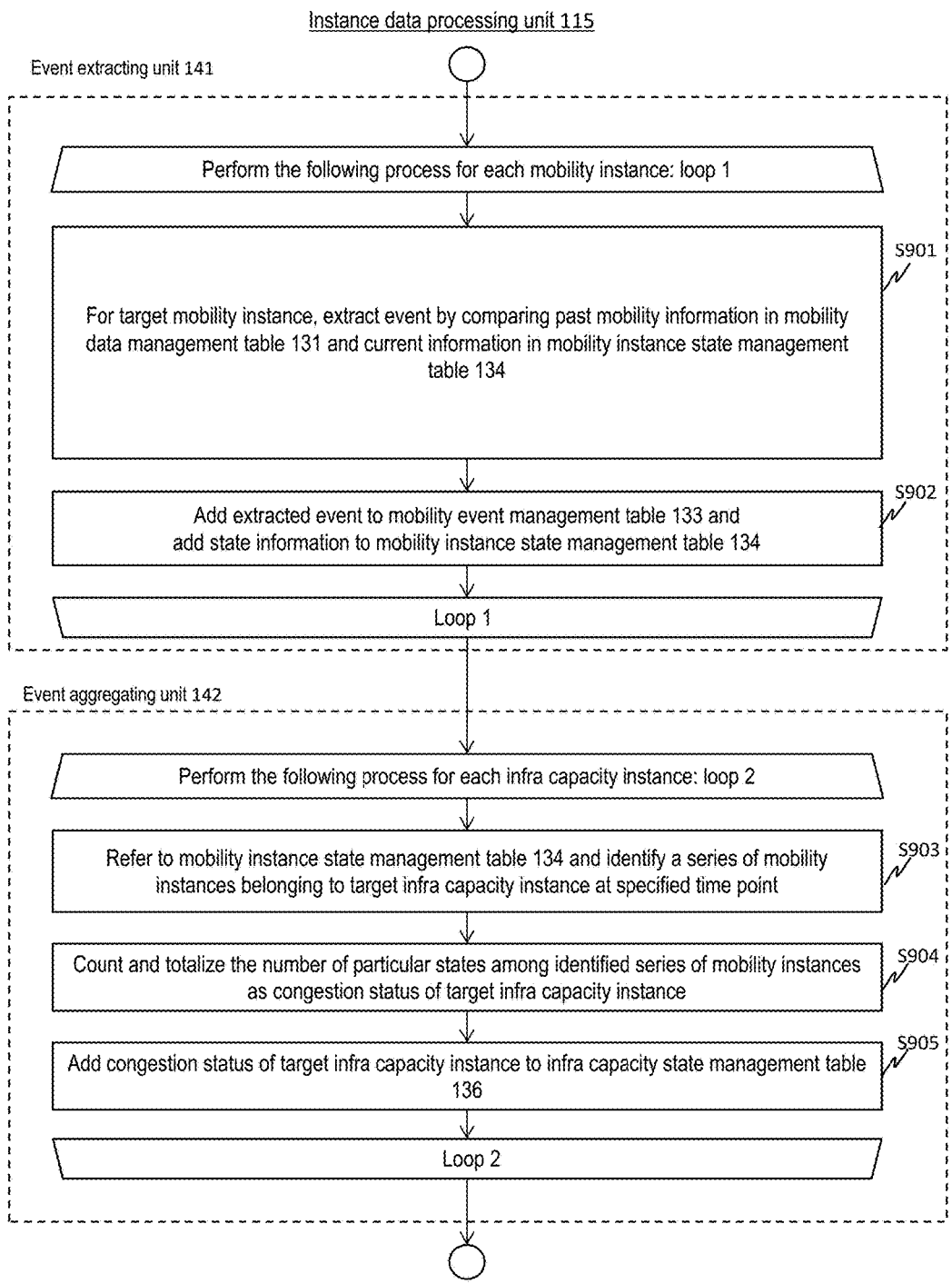
FIG. 9 is a flowchart showing an example of a process by an instance data processing unit according to the embodiment.

FIG. 9 is a flowchart showing an example of a process by an instance data processing unit according to the embodiment.

For data acquired from the field 103, the instance data processing unit 115 extracts events of mobility instances from mobility data of the mobility instances to identify state information about the mobility instances, and to aggregate infra capacity states (S901 to S905).

First, the event extracting unit 141 performs a process for extracting event information about each of the mobility instances (S901 and S902).

Specifically, the event extracting unit 141 performs the process of steps S901 and S902 described below for each mobility instance as a process target. In description of FIG. 9, the mobility instance as a process target will be referred to as a target mobility instance.

As for the target mobility instance, the event extracting unit 141 compares past mobility information in the mobility data management table 131 and present information in the mobility instance state management table 134 to extract an event (S901). Specifically, the event extracting unit 141 compares the past mobility data and present state of the target mobility instance, and, if there is no change in the position for a predetermined time or more, regards it as a stagnation event. If there is a predetermined amount of change or more in the position during a stagnation state, the event extracting unit 141 regards it as a movement event or determines it not as an event but as a numerical value such as speed.

Then, the event extracting unit 141 adds an entry corresponding to the extracted event to the mobility event management table 133 and adds or changes an entry corresponding to the target mobility instance to or in the mobility instance state management table 134 (S902).

After the above process (S901 and S902) are performed for each mobility instance, the event aggregating unit 142 performs a process for identifying the state of each infra capacity instance (steps S903 to S905).

Specifically, the event aggregating unit 142 performs the following process (S903 to S905) for each infra capacity instance as a process target. In the description of FIG. 9, the infra capacity instance as a process target will be referred to as a target infra capacity instance.

The event aggregating unit 142 refers to the mobility instance state management table 134 and identifies a series of mobility instances belonging to the target infra capacity instance within a specified range of time (S903). That a mobility instance belongs to a target infra capacity instance means that a geographical position of the mobility instance is near to the infra capacity instance. Whether a mobility instance belongs to a target infra capacity instance can be determined by a map matching process or the like.

Next, the event aggregating unit 142 counts and totalizes the number of particular states (for example, speed reduction, stagnation and the like) among the identified series of mobility instances, as the congestion status of the target infra capacity instance (S904). Then, the event aggregating unit 142 adds the aggregated congestion status of the infra capacity to the infra capacity state management table 136 (S905).

The event aggregating unit 142 performs the above process (S903 to S905) for each infra capacity instance as a target, and, after performing the process for all the infra capacity instances, ends the process.

Next, a process operation of the group data processing unit 116 of the management server 101 will be described.

Figure 10:
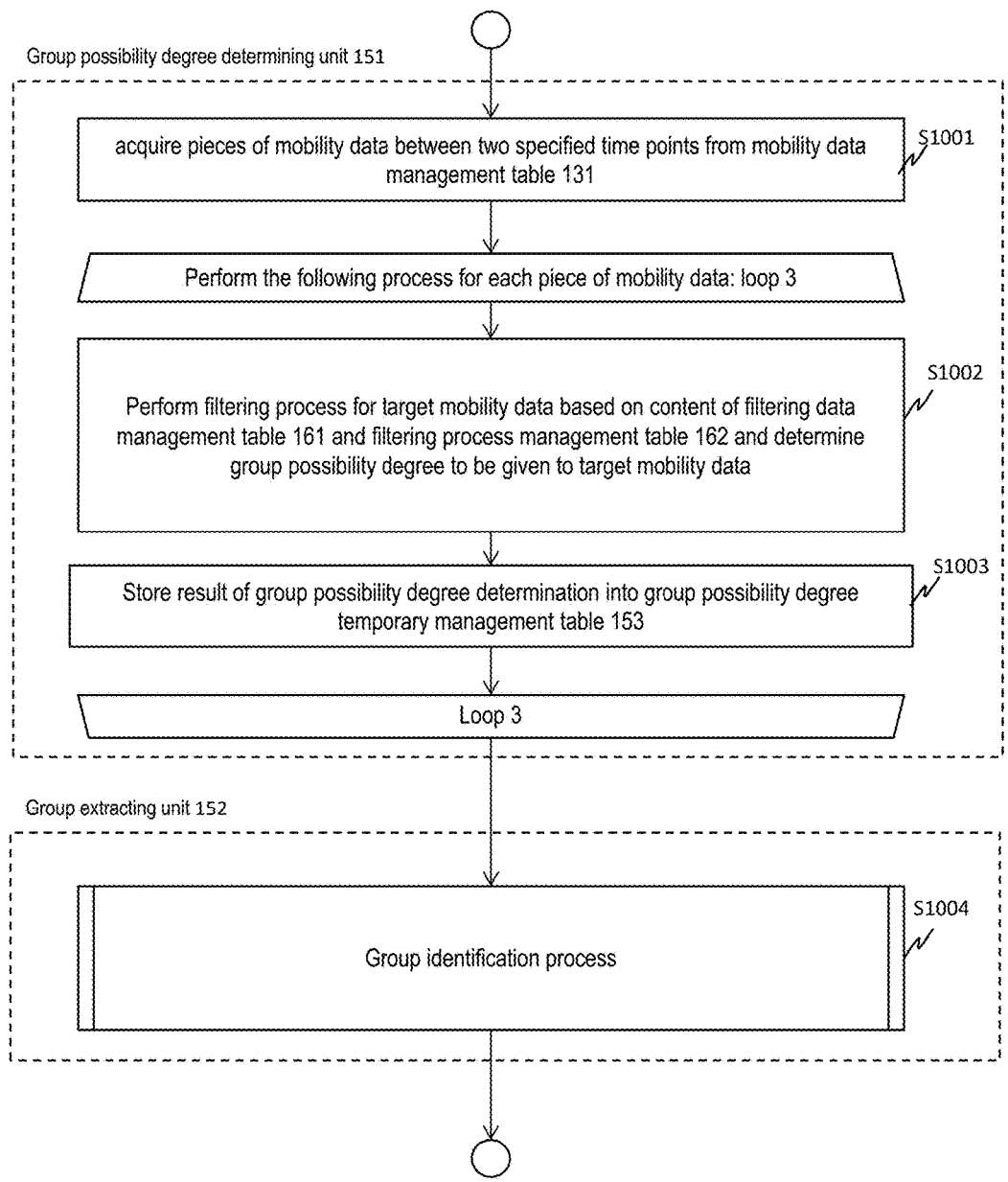
FIG. 10 is a flowchart showing an example of a process by a group data processing unit according to the embodiment.

FIG. 10 is a flowchart showing an example of a process by a group data processing unit according to the embodiment.

The group data processing unit 116 performs the following process (S1001 to S1004) to identify a group among the mobility instances 104.

First, the group possibility degree determining unit 151 performs a process (S1001 to S1003) for distinguishing weight information about a group possibility degree for mobility data and giving the weight to the mobility data.

Specifically, the group possibility degree determining unit 151 acquires mobility data in a range between two specified time points, from the mobility data management table 131 (S1001). Here, the two specified time points are time point to be a starting point of identifying mobility data to be used for a group identification process and time point to be an ending point. The ending point time point can be, for example, current time point. Further, the starting point time point may be arbitrary time point, for example, time point before a predetermined time from the current time point. The starting point time point can be changed by the administrator of the management server 101.

The group possibility degree determining unit 151 performs the following process (S1002 and S1003) for each piece of mobility data as a process target. In description of FIG. 10, the mobility data as a process target will be referred to as target mobility data.

The group possibility degree determining unit 151 performs a filtering process for target mobility data based on content of the filtering data management table 161 and the filtering process management table 162 (S1002). Specifically, the group possibility degree determining unit 151 performs map matching for map data and lowers the degree of group possibility (weight) of target mobility data which is not on a general road (for example, which is on a railway track) (for example, sets the degree to 0). Further, the group possibility degree determining unit 151 lowers the degree of group possibility of such target mobility data that distances from the time point and position of mobility data of a public transportation means are within predetermined ranges (for example, sets the degree to 0).

Then, the group possibility degree determining unit 151 stores a result of group possibility degree determination for the target mobility data into the group possibility degree temporary management table 153 (S1003).

After performing the above process (S1002 and S1003) for all the pieces of mobility data, the group extracting unit 152 performs the group identification process (see FIG. 11) for the pieces of mobility data with group possibility degrees which have been stored into the group possibility degree temporary management table 153, allocates a uniquely independent group ID to each of extracted groups, and adds the group IDs to the mobility group management table 135 (S1004).

Next, the group identification process by the group extracting unit 152 of the management server 101 will be described.

Figure 11:
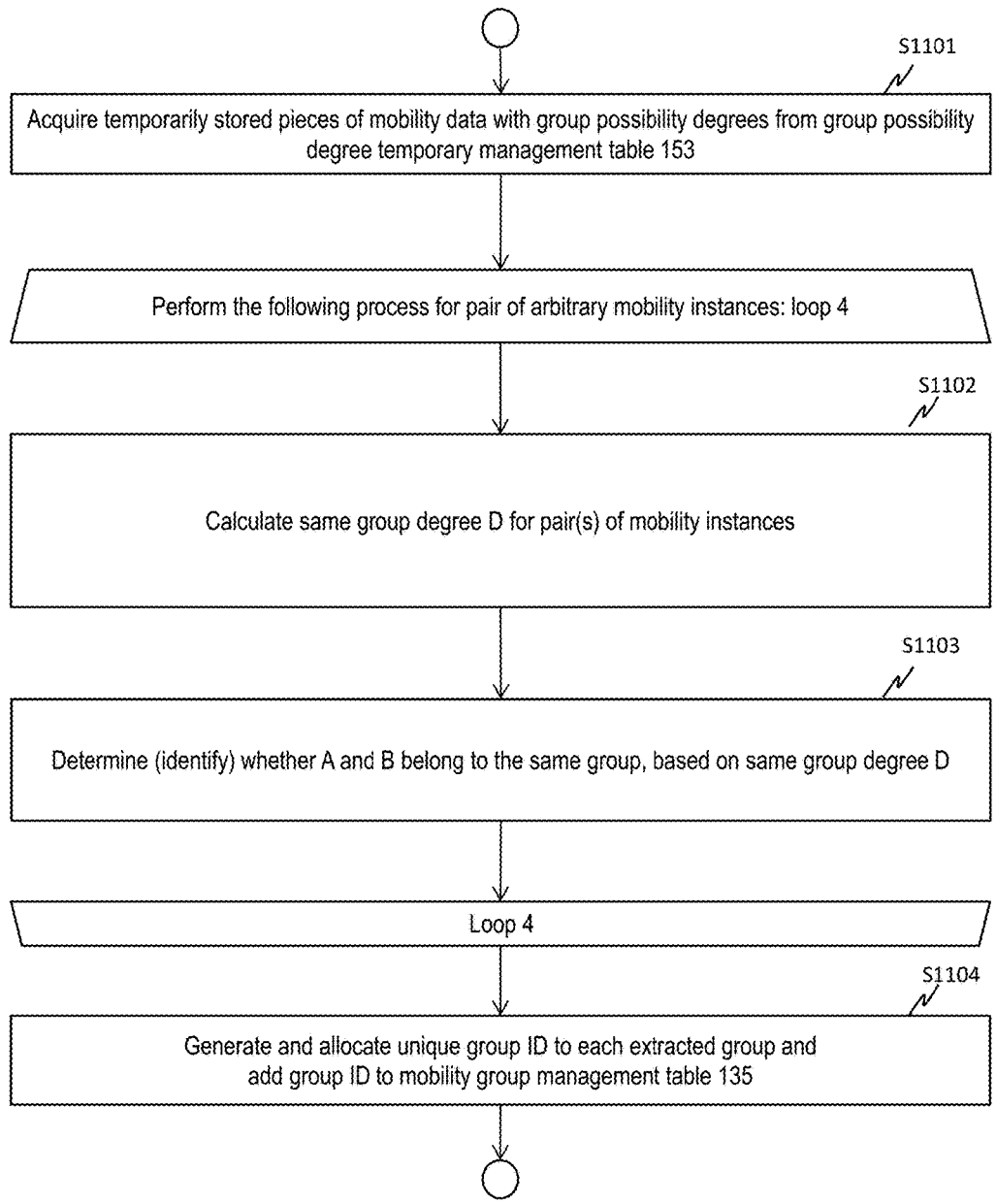
FIG. 11 is a flowchart showing an example of a process by a group extracting unit according to the embodiment.

FIG. 11 is a flowchart showing an example of a group identification process according to the embodiment. The group identification process is a process corresponding to step S1004 in FIG. 10.

The group extracting unit 152 acquires the pieces of mobility data with group possibility degrees which are temporarily stored, from the group possibility degree temporary management table 153 (S1101).

Then, the group extracting unit 152 decides a pair of mobility instances to be a process target (the mobility instances are assumed to be A and B in description of FIG. 11) among mobility instances corresponding to the acquired pieces of mobility data, and performs the following process (S1102 and S1103) for this pair.

First, for the pair of the mobility instances A and B, the group extracting unit 152 calculates a same group degree D for determining whether or not the mobility instances A and B belong to the same group with regard to movement (S1102).

A method for calculation of the same group degree D by the group extracting unit 152 will be described below. In the following description, pieces of mobility data with group possibility degrees of the mobility instances A and B are expressed as multidimensional vector arrays as below.

$$A=((T\_a1,X\_a1,Y\_a1,G\_a1),(T\_a2,X\_a2,Y\_a2,G\_a2),\ldots)$$

$$B=((T\_b1,X\_b1,Y\_b1,G\_b1),(T\_b2,X\_b2,Y\_b2,G\_b2),\ldots)$$

Here, (T, X, Y, G) corresponds to one entry of the group possibility degree temporary management table 153, and T, X, Y and G correspond to "time point", "X coordinate position", "Y coordinate position" and "group possibility degree" in an entry, respectively. Further, it is assumed that $T\_a1 < T\_a2 < \ldots$ and $T\_b1 < T\_b2 < \ldots$ are satisfied.

Paying attention to one entry ($T\_ai, X\_ai, Y\_ai, G\_ai$) of the mobility instance A, the group extracting unit 152 selects an entry ($T\_bj, X\_bj, Y\_bj, G\_bj$) of B having $T\_bj$ closest to $T\_ai$, and calculates a same group degree $D\_i$, which is one element of the same group degree D, by the following formula (1). Though the entry of B having $T\_bj$ closest to $T\_ai$ is selected, the selection is not limited thereto. For example, an entry of B having $T\_bj$ close to $T\_ai$ (for example, within a predetermined range of time) may be selected.

$$D\_i=L(1-G\_ai)+L(1-G\_bj)+(\alpha^*(T\_ai-T\_bj)^2+\beta^* ((X\_ai-X\_bj)^2+(Y\_ai-Y\_bj)^2)) \quad (1)$$

Here, $\alpha$, $\beta$ and L are parameters specified in advance.

The same group degree $D\_i$ is obtained by totalizing, for one piece of mobility data of the mobility instance A, a value obtained by adjusting a value obtained by subtracting the group possibility degree of the mobility data of A from 1, by L, a value obtained by adjusting a value obtained by subtracting the group possibility degree of the mobility data of B from 1, by L, and a value obtained by adjusting time distance and spatial distance by $\alpha$ and $\beta$. The same group degree $D\_i$ becomes a smaller value as the group possibility degree of the mobility data of A is higher, as the group possibility degree of the mobility data of B is higher and as the time distance and spatial distance between A and B are smaller. That is, the same group degree $D\_i$ becomes a smaller value as the possibility of the same group is higher.

The group extracting unit 152 performs the calculation of the same group degree $D\_i$ for all the pieces of mobility data of the mobility instance A. A set of the same group degrees $D\_i$ calculated in this way becomes the same group degree D.

Then, the group extracting unit 152 determines whether or not the mobility instances A and B belong to the same group with regard to movement, based on the calculated same group degree D (S1103). Specifically, if, for thresholds N and M specified in advance, the number of $D\_i$ satisfying $D\_i < N$ is M or more, the group extracting unit 152 determines that the mobility instances A and B belong to the same mobility group. For example, the threshold N may be 1. When the threshold N is set to 1, it is possible to, if the group possibility degree of the mobility data of A or the group possibility degree of the mobility data of B is set to 0 (that is, if the mobility data of A or B is to be removed), prevent the mobility data from contributing to determination that A and B belong to the same mobility group. That is, the process can be performed on the assumption that the mobility data has been removed.

After performing the above process (S1102 and S1103) for all mobility instance pairs among mobility instances corresponding to the acquired pieces of mobility data, as process targets, the group extracting unit 152 generates and allocates a unique group ID to each of extracted groups, adds the group IDs to the mobility group management table 135 (S1104) and ends the group identification process.

As described above, according to the group identification process, whether or not mobility instances belong to the same group is determined not by only point information about mobility data at a certain particular time point but by movement trajectory data (pieces of mobility data at a plurality of measurement points in the past) which is linear information. Therefore, it is possible to determine whether mobility instances belong to the same group or not with a high accuracy. Further, since whether mobility instances belong to the same group or not is determined with the use of weight (a group possibility degree) regarding easiness of identification of mobility context for mobility data, it is possible to exclude or reduce influence of mobility data from which identification of mobility context is not easy and improve the accuracy of group determination.

Next, a process by the notification content processing unit 117 of the management server 101 will be described.

Figure 12:
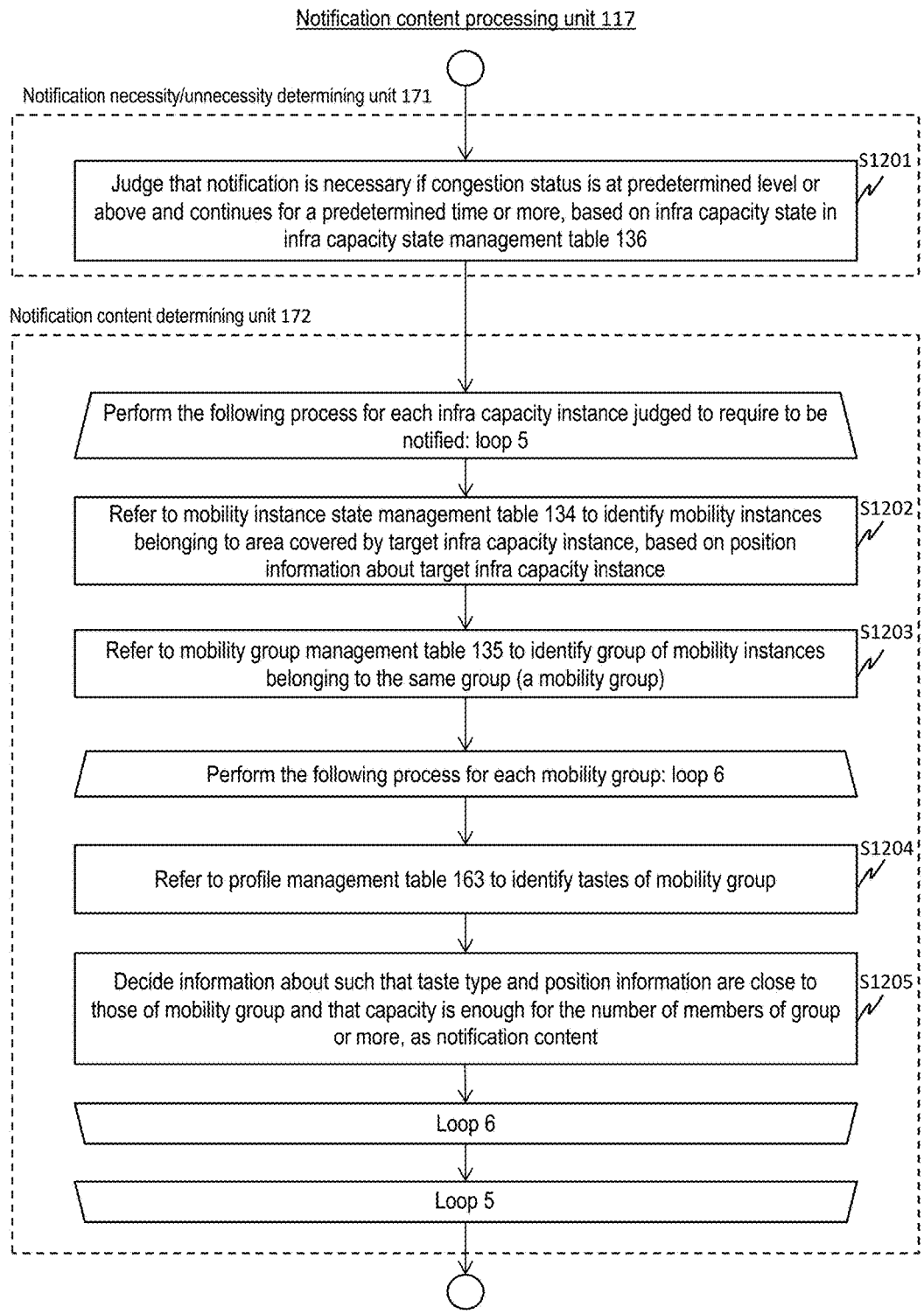
FIG. 12 is a flowchart showing an example of a process by a notification content processing unit according to the embodiment.

FIG. 12 is a flowchart showing an example of a process by the notification content processing unit according to the embodiment.

Performing the following process (S1201 to S1205), the notification content processing unit 117 performs notification such as for guiding mobility instances to an appropriate provider capacity, according to the congestion status of an infra capacity.

The notification necessity/unnecessity determining unit 171 judges that notification is necessary if a congestion status is at a predetermined level or above and continues for a predetermined time or more, based on capacity state information (congestion information) in the infra capacity state management table 136 (S1201).

Then, the notification content determining unit 172 performs the following process of steps S1202 to S1205 for each infra capacity instance judged to require to be notified as a process target. In description of FIG. 12, the infra capacity instance as a process target will be referred to as a target infra capacity instance.

First, the notification content determining unit 172 refers to the mobility instance state management table 134 to identify a group of mobility instances belonging to an area covered by a target infra capacity instance, based on position information about the target infra capacity instance (S1202).

Then, the notification content determining unit 172 refers to the mobility group management table 135 to identify a group of mobility instances belonging to the same group (a mobility group) with regard to movement, among the group of mobility instances identified at step S1202 (S1203).

Then, the notification content determining unit 172 performs the following process (S1204 and S1205) for each mobility group as a process target.

Specifically, the notification content determining unit 172 refers to the profile management table 163 to identify the tastes of the process target mobility group (S1204). As a method for identifying the tastes of the mobility group, there is, for example, a method of determining a logical product or a logical sum for profile information about each mobility instance belonging to the mobility group, which is recorded in the profile management table 163.

Next, the notification content determining unit 172 refers to the provider capacity state management table 132 and determines information about such a provider capacity instance that taste type and position information is close to that of the mobility group and that the capacity is sufficiently enough for the number of members of the group or more, as notification content (S1205).

If having performed the process (S1204 and S1205) for all the mobility groups identified at step S1203 as process targets, the notification content determining unit 172 performs the process (S1202 to S1205) for another infra capacity instance as a process target. Then, having executed the process (steps S1202 to S1205) for all infra capacity instances judged to require to be notified as process targets, the notification content determining unit 172 ends the process.

The notification content decided by the notification content determining unit 172 in this way is transmitted to terminals 102a of mobility instances (users) belonging to a notification target mobility group, by the data delivering unit 181.

Next, description will be made on the GUI (Graphical User Interface) of the terminals 102a which have received the notification content transmitted by the data delivering unit 181.

Figure 13:
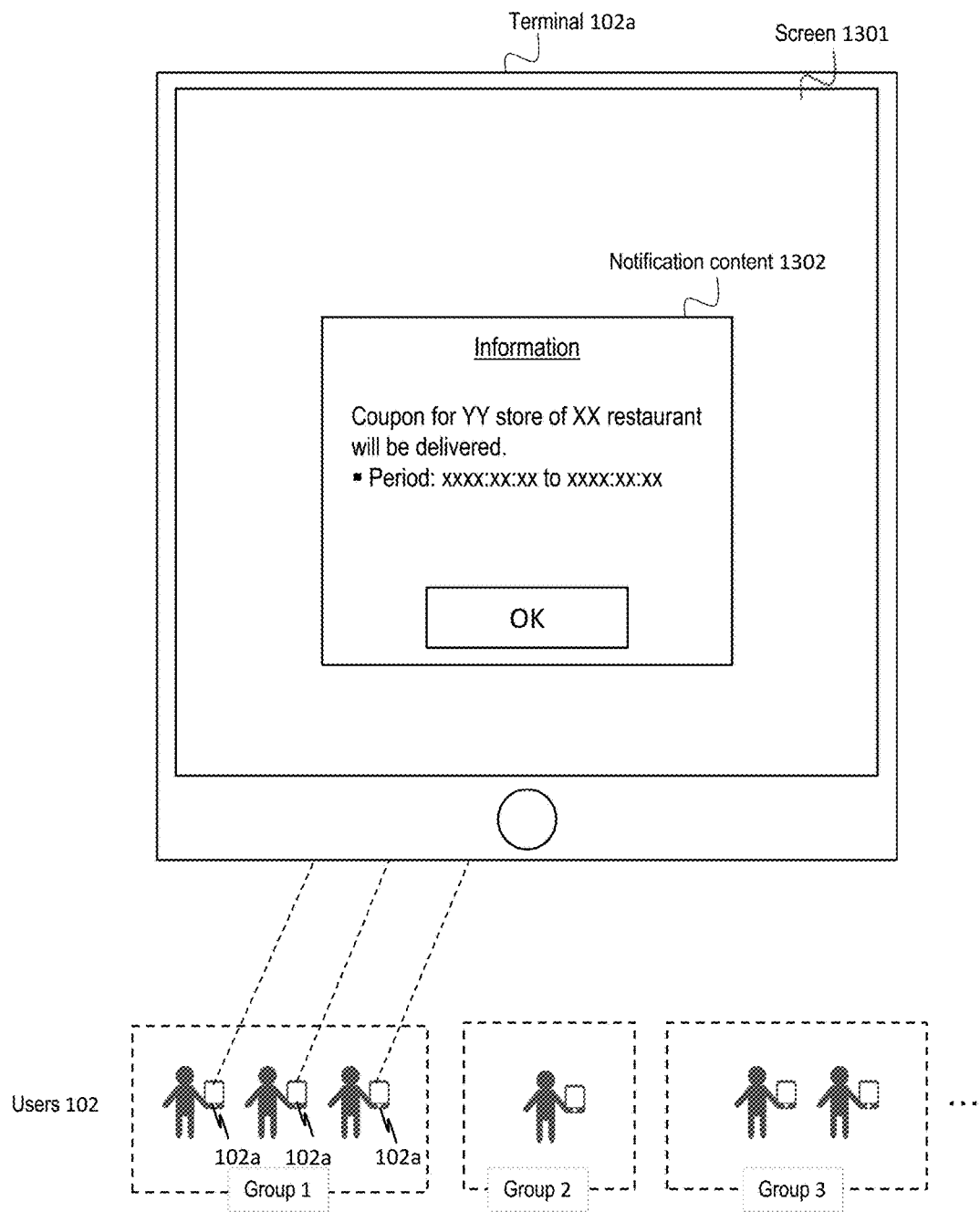
FIG. 13 is a diagram showing an example of a GUI of a terminal of a user according to the embodiment.

FIG. 13 is a diagram showing an example of the GUI of the user terminal according to the embodiment.

When the notification content is transmitted by the data delivering unit 181, each of the terminals 102a of the plurality of users belonging to the transmission target mobility group receives the notification content and displays similar notification content 1302 on its screen 1301.

In the example of FIG. 13, the notification content is a coupon for an eating house meeting the tastes of the users belonging to the mobility group. As a result, it is possible to effectively guide all the users belonging to the same mobility group to move to the eating house with this coupon as an incentive.

The present invention is not limited to the above embodiment but can be appropriately modified and practiced within a range not departing from the spirit of the present invention.

For example, in the above embodiment, instance type information may be included in the data the management server 101 accepts from a mobility instance or a capacity instance or may not be included in the data. For example, if the instance type information is not included in the data to be accepted, a table which manages meta data regarding correspondence relationships between mobility instance IDs and pieces of instance type information may be stored in the management server 101 in advance so that the metadata of this table may be used to identify type information corresponding to a mobility instance ID in accepted data. As for a capacity instance also, a table may be stored similarly to the case of a mobility instance so that type information may be identified by a similar process. Further, position information about a capacity instance also may not be included in the data accepted by the management server 101. For example, as for a capacity instance which does not move such as a facility, it is thought that position information is often not included in the data. If position information is not included in the data to be accepted, a table which manages metadata regarding correspondence relationships between capacity instance IDs and pieces of position information (pieces of position information expressed by addresses are also possible) may be stored in the management server 101 so that position information about a capacity instance may be identified based on the metadata of this table.

Further, though, in the above embodiment, weight regarding easiness of identification of mobility context is given to mobility data of a mobility instance, and mobility data is treated as having been substantially removed by setting the weight to 0, the present invention is not limited thereto. For example, in order to remove such mobility data that easiness of identification of mobility context is low, that is, identification of mobility context is difficult, from process targets, a process for removing such mobility data that identification of mobility context is difficult from mobility data acquired at step S1001 may be performed instead of the process of steps S1002 and S1003 in FIG. 10. By doing so, for example, a processing load in the succeeding group identification process (S1004) of the group extracting unit 152 can be reduced.

Further, though, in the above embodiment, various pieces of data are managed in a configuration using an RDB (Relational DataBase), the present invention is not limited thereto. The various pieces of data may be managed by a data management system with a high scalability such as an appropriate KVS (Key-Value Store) in consideration of consistency of data.

Further, though, in the above embodiment, each of the management server 101 and the various tables is expressed by one block diagram, the present invention is not limited thereto. The management server 101 and the various tables may be distributed in consideration of scalability. The management server 101 may embodied by a plurality of computers having hardware and software, and each functional unit may be embodied by a computer having hardware and software. For example, a plurality of management servers may be prepared so that management targets of the management servers are divided according to geographical areas, and load balance and routing is performed by the gateway 106. In this case, correspondence relationships among the management targets, pieces of position information and network addresses of the management servers can be managed by the gateway 106.

Further, though, in the above embodiment, an example is shown in which each of the functional units of the management server 101 is configured by a processor executing a program, the present invention is not limited thereto. Apart or all of the functional units may be configured, for example, by hardware such as an integrated circuit. Further, in the above embodiment, the program configuring the functional units and information such as tables and files may be provided by a recording medium in which a program code and the like are recorded. In this case, the functional units can be realized by a processor of a computer reading and executing the program in the recording medium. As the recording medium for supplying the program code, for example, a flexible disk, CD-ROM, DVD (Digital Versatile Disc)-ROM, hard disk, SSD (Solid State Drive), optical disk, magneto-optical disk, CD-R, magnetic tape, non-volatile memory card, IC (Integrated Circuit) card, SD (Secure Digital) memory card, ROM or the like can be used. Further, it is also possible to, by delivering the program configuring the functional units via a network, store the program into a storage unit of a computer such as a hard disk and a memory or a storage medium such as a CD-RW and a CD-R so that a processor provided in the computer may read and execute the program code stored in the storage unit or the storage medium. Further, a part or all of the functional units of the management server 101 may be realized by virtual hardware (a virtual machine).

What is claimed is:

1. A mobility data processing apparatus identifying, for one or more movable mobility instances existing in real space, mobility context which is information indicating a characteristic of a movement relationship with another mobility instance, the mobility data processing apparatus comprising:
    a mobility data managing unit configured to store pieces of mobility data including space information and time information about the plurality of mobility instances;
    a process executing unit configured to execute a predetermined process for improving identification of the mobility context, for the pieces of mobility data; and
    a mobility context identifying unit configured to, based on a time distance and a spatial distance between a piece of mobility data of one mobility instance and a piece of mobility data of another mobility instance, identify mobility context of the one mobility instance after the process by the process executing unit.

2. The mobility data processing apparatus according to claim 1, wherein the mobility context is information showing whether or not a mobility instance belongs to a group performing the same movement as the other mobility instance.

3. The mobility data processing apparatus according to claim 2, wherein the mobility context identifying unit is configured to, based on a time distance and a spatial distance between one piece of mobility data of the one mobility instance and a piece of mobility data with a short time distance among pieces of mobility data of the other mobility instance, identify whether or not the one mobility instance and the other mobility instance belong to the same group performing the same movement.

4. The mobility data processing apparatus according to claim 3, wherein the mobility context identifying unit is configured to, for each of a plurality of pieces of mobility data of the one mobility instance, determine a time distance and a spatial distance from the piece of mobility data with a short time distance among the pieces of mobility data of the other mobility instance and identify whether or not the one mobility instance and the other mobility instance belong to the same group performing the same movement based on the time distance and the spatial distance.

5. The mobility data processing apparatus according to claim 1, wherein the predetermined process for improving identification of the mobility context is a process for giving weight with regard to easiness of identification of the mobility context to the pieces of mobility data; and
the mobility context identifying unit is configured to, based on the time distance and the spatial distance between the piece of mobility data of the one mobility instance and the piece of mobility data of the other mobility instance, and the weight with regard to the easiness of identification of the mobility context given to the pieces of mobility data, identify mobility context of the one mobility instance.

6. The mobility data processing apparatus according to claim 5, wherein
the process for giving the weight with regard to the easiness of identification of the mobility context to the pieces of mobility data is a process for giving weight indicating that the easiness of identification of the mobility context is low to a piece of mobility data showing being positioned on a railway track based on map data; and
the process executing unit is configured to give the weight indicating that the easiness is low to the piece of mobility data showing being positioned on the railway track from among the pieces of mobility data.

7. The mobility data processing apparatus according to claim 5, wherein
the process for giving the weight with regard to the easiness of identification of the mobility context to the pieces of mobility data is a process for giving the weight indicating that the easiness of identification of the mobility context is low to a piece of mobility data showing being on a public transportation system mobility instance; and
the process executing unit is configured to give the weight indicating that the easiness is low to the piece of mobility data showing being on the public transportation system mobility instance from among the pieces of mobility data.

8. The mobility data processing apparatus according to claim 1, wherein
the predetermined process for improving identification of the mobility context is a process for removing a predetermined piece of mobility data without the easiness of identification of the mobility context from among the pieces of mobility data;
the process executing unit is configured to remove the predetermined piece of mobility data from among the pieces of mobility data; and
the mobility context identifying unit is configured to, based on the pieces of mobility data from which the predetermined piece of mobility data has been removed, measure the time distance and the spatial distance between the piece of mobility data of the one mobility instance and the piece of mobility data of the other mobility instance to identify the mobility context of the one mobility instance.

9. The mobility data processing apparatus according to claim 8, wherein
the process for removing the predetermined piece of mobility data is a process for removing a piece of mobility data showing being positioned on a railway track based on map data; and
the process executing unit is configured to remove the piece of mobility data showing being positioned on the railway track from among the pieces of mobility data.

10. The mobility data processing apparatus according to claim 8, wherein
the process for removing the predetermined piece of mobility data is a process for removing a piece of mobility data showing being on a public transportation system mobility instance; and
the process executing unit is configured to remove the piece of mobility data showing being on the public transportation system mobility instance from among the pieces of mobility data.

11. The mobility data processing apparatus according to claim 1, further comprising:
a group identifying unit configured to identify one or more mobility instances belonging to a group performing the same movement based on the mobility context; and
a data delivering unit configured to, by transmitting data including the same content to terminals of the mobility instances belonging to the group performing the same movement, cause the terminals to display the same content.

12. The mobility data processing apparatus according to claim 11, further comprising:
a capacity instance managing unit configured to manage information showing statuses of accommodation of the mobility instances of one or more capacity instances capable of accommodating the mobility instances; and
an excess detecting unit configured to detect excess of capacities of the capacity instances; wherein
if it is detected that the capacity of the capacity instances is exceeded, the data delivering unit is configured to transmit information about another capacity instance the capacity of which is not exceeded, to the mobility instances belonging to a group performing the same movement which is accommodated in the capacity instance.

13. The mobility data processing apparatus according to claim 12, further comprising:
an extraction unit configured to compare a plurality of pieces of mobility data of the mobility instance to extract a state of the mobility instance; and
an aggregation unit configured to aggregate the statuses of accommodation of the mobility instances based on states of the mobility instances and register a result of the aggregation with the capacity instance managing unit.

14. A mobility data processing method by a mobility data processing apparatus identifying, for one or more movable mobility instances existing in real space, mobility context which is information indicating a characteristic of a movement relationship with another mobility instance, the mobility data processing method comprising:
storing pieces of mobility data including space information and time information about the plurality of mobility instances;
executing a predetermined process for improving identification of the mobility context, for the pieces of mobility data; and
based on a time distance and a spatial distance between a piece of mobility data of one mobility instance and a piece of mobility data of another mobility instance, identifying mobility context of the one mobility instance after the process.

15. A mobility data processing system provided with a management server capable of performing communication via a network and a mobile terminal; wherein
the management server comprises:
a mobility data managing unit configured to store pieces of mobility data including space information and time information about the plurality of mobility instances;
a process executing unit configured to execute a predetermined process for improving identification of the mobility context, for the pieces of mobility data; and
a mobility context identifying unit configured to, based on a time distance and a spatial distance between a piece of mobility data of one mobility instance and a piece of mobility data of another mobility instance, identify mobility context of the one mobility instance after the process is performed by the process executing unit.

* * * * *